(12) United States Patent
Xu et al.

(10) Patent No.: US 11,138,323 B2
(45) Date of Patent: Oct. 5, 2021

(54) BLOCKCHAIN-BASED CONTENT MANAGEMENT SYSTEM, METHOD, APPARATUS, AND ELECTRONIC DEVICE

(71) Applicant: ADVANCED NEW TECHNOLOGIES CO., LTD., Grand Cayman (KY)

(72) Inventors: Hui Xu, Hangzhou (CN); Zhiguo Li, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 14 days.

(21) Appl. No.: 16/708,133

(22) Filed: Dec. 9, 2019

(65) Prior Publication Data

US 2020/0202014 A1  Jun. 25, 2020

(30) Foreign Application Priority Data

Dec. 20, 2018  (CN) .......................... 201811565664.7

(51) Int. Cl.
*G06F 21/60* (2013.01)
*G06F 21/62* (2013.01)
*H04L 9/06* (2006.01)

(52) U.S. Cl.
CPC ........ *G06F 21/602* (2013.01); *G06F 21/6218* (2013.01); *H04L 9/0637* (2013.01); *H04L 9/0643* (2013.01); *G06F 21/6254* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 8,826,443 | B1 * | 9/2014 | Raman | .................. G06F 11/004 726/26 |
| 9,785,369 | B1 * | 10/2017 | Ateniese | ................ H04L 9/3221 |
| 9,967,096 | B2 * | 5/2018 | Ateniese | .................. G06F 21/53 |

(Continued)

FOREIGN PATENT DOCUMENTS

| | | |
|---|---|---|
| CN | 106033461 A | 10/2016 |
| CN | 106815530 A | 6/2017 |
| WO | 2019222742 A1 | 11/2019 |

OTHER PUBLICATIONS

Zyskind et al.; Enigma: Decentralized Computation Platform with Guaranteed Privacy; 2015; Retrieved from the Internet https://arxiv.org/pdf/1506.03471.pdf; pp. 1-14, as printed. (Year: 2015).*

(Continued)

*Primary Examiner* — Michael W Chao

(57) ABSTRACT

One or more embodiments of this specification provide a blockchain-based content management system, method, and apparatus, and an electronic device. The system may include: a blockchain node, configured to determine whether content for storage includes predetermined content, in response to determining that the content does not include the predetermined content, submit the content to a blockchain for the blockchain to record the content, and in response to determining that the content includes the predetermined content, submit a hash value of the content to the blockchain for the blockchain to record the hash value.

15 Claims, 4 Drawing Sheets

(56) References Cited

U.S. PATENT DOCUMENTS

| | | | | |
|---|---|---|---|---|
| 10,114,963 | B1* | 10/2018 | Griffin | G06F 21/6209 |
| 10,296,248 | B2* | 5/2019 | Ateniese | G06F 16/1805 |
| 10,310,760 | B1* | 6/2019 | Dreier | G06F 3/0631 |
| 10,601,598 | B2* | 3/2020 | Finlow-Bates | H04L 63/12 |
| 10,686,611 | B2* | 6/2020 | Ramos | H04L 9/3239 |
| 2011/0055932 | A1* | 3/2011 | Fox | G06F 21/6218 726/27 |
| 2013/0312109 | A1* | 11/2013 | Arasaratnam | G06F 21/602 726/26 |
| 2014/0304825 | A1* | 10/2014 | Gianniotis | G06F 21/60 726/26 |
| 2014/0351943 | A1* | 11/2014 | Gianniotis | H04L 63/0407 726/26 |
| 2016/0110352 | A1* | 4/2016 | Bendersky | G06F 16/93 707/602 |
| 2016/0283920 | A1* | 9/2016 | Fisher | H04L 9/3297 |
| 2016/0292396 | A1* | 10/2016 | Akerwall | G06F 21/10 |
| 2017/0053131 | A1 | 2/2017 | Modi et al. | |
| 2017/0063880 | A1* | 3/2017 | Freed | H04L 63/1408 |
| 2017/0134161 | A1 | 5/2017 | Goeringer et al. | |
| 2017/0177898 | A1 | 6/2017 | Dillenberger | |
| 2017/0206523 | A1 | 7/2017 | Goeringer et al. | |
| 2017/0243193 | A1* | 8/2017 | Manian | G06Q 20/3829 |
| 2017/0262902 | A1 | 9/2017 | Weston et al. | |
| 2017/0329980 | A1* | 11/2017 | Hu | G06F 21/606 |
| 2018/0115416 | A1 | 4/2018 | Diehl | |
| 2018/0131706 | A1* | 5/2018 | Anderson | H04L 9/3236 |
| 2018/0137512 | A1* | 5/2018 | Georgiadis | G06Q 20/065 |
| 2018/0189753 | A1* | 7/2018 | Konda | G06Q 20/065 |
| 2018/0211202 | A1 | 7/2018 | Ynion, Jr. et al. | |
| 2018/0218364 | A1 | 8/2018 | Cantrell et al. | |
| 2018/0219683 | A1* | 8/2018 | Deery | H04L 9/3239 |
| 2018/0323980 | A1 | 11/2018 | Ahn et al. | |
| 2018/0374173 | A1 | 12/2018 | Chen et al. | |
| 2019/0036696 | A1 | 1/2019 | Anglin et al. | |
| 2019/0102842 | A1 | 4/2019 | Pandian | |
| 2019/0155997 | A1 | 5/2019 | Vos et al. | |
| 2019/0354717 | A1* | 11/2019 | Boon | G06F 21/6254 |
| 2019/0362376 | A1 | 11/2019 | Newell et al. | |
| 2019/0372756 | A1 | 12/2019 | Kim et al. | |
| 2020/0127812 | A1* | 4/2020 | Schuler | H04L 9/0637 |
| 2020/0128022 | A1* | 4/2020 | Bleikertz | H04L 63/123 |
| 2020/0142864 | A1* | 5/2020 | Bastide | G06F 21/64 |
| 2020/0204563 | A1* | 6/2020 | Simons | G06F 21/6254 |

OTHER PUBLICATIONS

Al-Zaben et al.; General Data Protection Regulation Blockchain Architecture for Personally Identifiable Information Management; 2018; retrieved from the Internet https://ieeexplore.ieee.org/abstract/document/8658586; pp. 1-6, as printed. (Year: 2018).*

Lima, Claudio; Blockchain—GDPR Privacy by Design; 2018; retrieved from the Internet https://blockchain.ieee.org/images/files/pdf/blockchain-gdpr-privacy-by-design.pdf; pp. 1-5 as printed. (Year: 2018).*

Greenspan; Scaling Blockchains with off-chain data; Jun. 2018; Retrived from the Internet https://www.multichain.com/blog/2018/06/scaling-blockchains-off-chain-data; pp. 1-11, as printed. (Year: 2018).*

Written Opinion and International Search Report for PCT Application No. PCT/US2019/065284 dated Feb. 19, 2020.

Anonymous, "Learn to securely share files on the blockchain with IPFS!", Feb. 20, 2018..

Wulf Kaal, "How can blockchain be used as a database to store data?", Jul. 19, 2017.

Lukas Marx, "Storing Data on the Blockchain: The Developers Guide—malcoded", Jul. 5, 2018.

Andrew Mccallum et al., "Text Classification by Bootstrapping with Keywords, EM and Shrinkage", Oct. 6, 1999.

First Search Report for Chinese Application No. 201811565664.7 dated Feb. 16, 2020.

International Preliminary Report on Patentability for PCT Application No. PCT/US2019/065284 dated Nov. 10, 2020.

* cited by examiner

BLOCKCHAIN-BASED CONTENT MANAGEMENT SYSTEM, METHOD, APPARATUS, AND ELECTRONIC DEVICE

CROSS REFERENCE TO RELATED APPLICATION

The present application is based on and claims priority to Chinese Patent Application No. 201811565664.7, filed on Dec. 20, 2018, which is incorporated herein by reference in its entirety.

TECHNICAL FIELD

One or more embodiments of this specification relate to the field of blockchain technologies, particularly to a blockchain-based content management system, method, and apparatus, and an electronic device.

BACKGROUND

Based on features of a chained data structure and distributed data storage of a blockchain, data on the blockchain cannot be modified or deleted. Therefore, it can effectively prevent a user from performing malicious behaviors, such as tampering or deletion, on the data on the blockchain. Moreover, through a blockchain ledger maintained by blockchain nodes, the data on the blockchain can be accessed at any time.

SUMMARY

Accordingly, one or more embodiments of this specification provide a blockchain-based content management system, method, and apparatus, and an electronic device.

According to a first aspect of one or more embodiments of this specification, a blockchain-based content management system is provided, including: a blockchain node, configured to determine whether content for storage includes predetermined content, in response to determining that the content does not include the predetermined content, submit the content to a blockchain for the blockchain to record the content, and in response to determining that the content includes the predetermined content, submit a hash value of the content to the blockchain for the blockchain to record the hash value.

According to a second aspect of one or more embodiments of this specification, a blockchain-based content management method is provided. The method is implementable by a blockchain node, and includes: determining whether content for storage includes predetermined content; in response to determining that the content does not include the predetermined content, submitting the content to a blockchain for the blockchain to record the content; and in response to determining that the content includes the predetermined content, submitting a hash value of the content to the blockchain for the blockchain to record the hash value.

According to a third aspect of one or more embodiments of this specification, a blockchain-based content management method is provided. The method is implementable by a blockchain node, and includes: generating a corresponding hash value for content submitted by a client; submitting the hash value to a blockchain, so that the hash value is recorded into a blockchain ledger; and storing the content into a centralized storage space.

The specification further provides a blockchain-based content management apparatus. The apparatus is implementable by a blockchain node, and includes: a generating unit, configured to generate a corresponding hash value for content submitted by a client; a submission unit, configured to submit the hash value to a blockchain, so that the hash value is recorded into a blockchain ledger; and a storage unit, configured to store the content into a centralized storage space.

The specification further provides another blockchain-based content management apparatus. The apparatus is implementable by a blockchain node, and includes: an obtaining unit, configured to obtain content submitted by a client; a first submission unit, configured to submit the content to a blockchain when the content does not include the predetermined content, so that the content is recorded into a blockchain ledger; and a second submission unit, configured to submit a hash value of the content to the blockchain when the content belongs to predetermined content.

The specification further provides a blockchain-based content management electronic device, including: a processor; and a memory, configured to store processor executable instructions; where the processor runs the executable instructions to implement the method according to the second aspect.

The specification further provides another blockchain-based content management electronic device, including: a processor; and a memory, configured to store processor executable instructions; where the processor runs the executable instructions to implement the method according to the third aspect.

The specification further provides a blockchain-based content management method, implementable by a blockchain node. The method may include determining whether content for storage includes predetermined content, in response to determining that the content does not include the predetermined content, submitting the content to a blockchain for the blockchain to record the content, and in response to determining that the content includes the predetermined content, submitting a hash value of the content to the blockchain for the blockchain to record the hash value and submitting the content to a centralized server.

DETAILED DESCRIPTION OF THE INVENTION

Embodiments will be described in detail, with examples shown in the accompanying drawings. When the description below involves the accompanying drawings, unless otherwise indicated, the same numeral in different accompanying drawings stands for the same element or similar elements. The implementation manners described in the following embodiments do not represent all the implementation manners consistent with the specification. Rather, they are examples of the apparatuses and methods described in detail in the attached claims and consistent with some aspects of one or more embodiments of the specification.

In some embodiments, steps of corresponding methods are not necessarily performed according to the sequence shown and described in this specification. In some other embodiments, the methods may include more or fewer steps than those described in this specification. In addition, a single step described in this specification may be split into a plurality of steps in other embodiments. A plurality of steps described in this specification may be combined into a single step in other embodiments.

In the specification, "predetermined," "preset" and "predefined" are used interchangeably.

Figure 1:
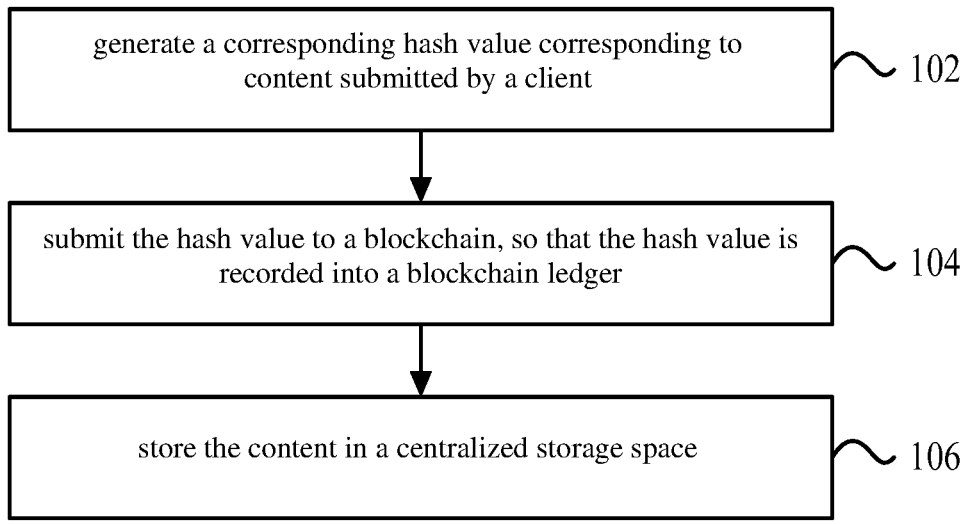
FIG. 1 is a flowchart of a blockchain-based content management method according to some embodiments.

FIG. 1 is a flowchart of a blockchain-based content management method according to some embodiments. As shown in FIG. 1, the method is applied to a blockchain node, and may include the following steps:

Step 102: Generate a corresponding hash value for content submitted by a client.

In some embodiments, the blockchain node may receive content submitted by a client and release a hash value corresponding to the content to a blockchain by submitting a blockchain transaction to the blockchain, so that the hash value is recorded into a blockchain ledger.

The transaction described in this specification refers to a piece of data that is created by a user through a client and that needs to be finally released to a distributed database of a blockchain. Transactions in the blockchain are classified into transactions in a narrow sense and transactions in a broad sense. A transaction in a narrow sense refers to a value transfer released by a user to the blockchain. For example, in a conventional Bitcoin blockchain network, a transaction may be a transfer initiated by a user in the blockchain. A transaction in a broad sense refers to business data released by a user to the blockchain. For example, an operator may establish a consortium blockchain based on an actual business requirement, and deploy some online services of other types irrelevant to value transfer (for example, a house renting service, a vehicle scheduling service, an insurance claim settlement service, a credit service, and a medical service) relying on the consortium blockchain. In such a consortium blockchain, a transaction may be a service message or a service request with a service intention released by a user in the consortium blockchain.

Step 104: Submit the hash value to a blockchain, so that the hash value is recorded into a blockchain ledger.

Step 106: Store the content in a centralized storage space.

In some embodiments, the hash value corresponding to the content is submitted to the blockchain, and the content is stored into a centralized storage space, for example, in a centralized recordkeeping server. In other words, only the hash value is recorded into the blockchain ledger after being released to the blockchain, while the content is not released to the blockchain. Therefore, the content can be kept privately to prevent leakage and, according to a unique mapping relationship between the hash value and the content, the corresponding content can be retrieved and traced in the centralized storage space based on the hash value. Moreover, because the hash value is recorded and certified in the blockchain ledger after being released to the blockchain, and data in the blockchain ledger is tamper-resistant. It can be verified whether content stored in the centralized storage space is tampered, thereby achieving extremely high data security.

Moreover, even if the content doesn't include predetermined content, the data volume in the blockchain ledger can be reduced significantly by storing the content in the centralized storage space instead of the blockchain ledger. Content with an excessively large data volume is prevented from being released to the blockchain, thereby alleviating data storage pressure of each blockchain node. Moreover, by recording the hash value in the blockchain ledger, content stored in the centralized storage space can be verified to determine whether the related content is tampered, thereby achieving high data security.

In some embodiments, the centralized storage space may include distributed storage spaces of the blockchain (e.g., respective storage spaces of the blockchain nodes for maintaining the blockchain ledger) to ensure that the content cannot be obtained randomly by the blockchain nodes after being stored into the centralized storage space. For example, the centralized storage space may include: a storage space corresponding to a blockchain node, such as a local space of the blockchain node, or a cloud space corresponding to the blockchain node. For another example, the centralized storage space may include: a storage space of a centralized recordkeeping server. Although the centralized storage space is logically different from the distributed storage spaces of the blockchain, the centralized storage space can technically adopt distributed storage architectures in related technology domains, which are not limited in this specification.

In some embodiments, the centralized storage space has a corresponding administrator, who has a management permission of the centralized storage space. When the content is determined as including the predetermined content, the administrator can perform access permission management on the content by, for example, allowing only objects in a whitelist to access the content, prohibiting objects in a blacklist from accessing the content, allowing only objects whose permission levels are not lower than a preset level to access the content, or allowing only objects authorized by the administrator to access the content, another suitable access permission management policy, or any combination thereof. The administrator of the centralized storage space may include the foregoing blockchain node; alternatively, the administrator of the centralized storage space may include an object other than the blockchain node. For example, when the centralized storage space is a centralized server, the administrator may be administrative personnel of the centralized server.

In some embodiments, the blockchain node may identify the content submitted by the client, to determine whether the content includes the predetermined content. For example, when the content does not comprise the predetermined content, the content may be stored into the centralized storage space. By doing so, the data volume of the blockchain ledger may be reduced, each object may access the content through the centralized storage space, and content maintained in the centralized storage space can be verified according to the hash value recorded in the blockchain ledger. When the content includes the predetermined content, the blockchain node may delete the content to prevent leakage of the content.

In some embodiments, when the content includes the predetermined content, the blockchain node may add an identifier to the hash value and/or the content, so as to quickly recognize that the content or the content corresponding to the related hash value includes the predetermined content. When the administrator of the centralized storage space is not the foregoing blockchain node, the administrator can determine that the content includes the predetermined content based on the identifier associated with the content. Based on the determination, the administrator may implement corresponding management means for the content, for example, an access permission management scheme, and the like. Alternatively, when receiving content provided by the blockchain node, the administrator may calculate a hash value of the content and search the blockchain ledger based on the hash value to find a blockchain transaction including the hash value, and determine whether the blockchain transaction includes the foregoing identifier. When the blockchain transaction includes the identifier indicating the content includes the predetermined content, the corresponding content management means may be implemented for the content; otherwise, the content may be managed as ordinary content.

In some embodiments, the content may be compared with a predefined lexicon. When the content contains a keyword from the predefined lexicon, the content is determined as including the predetermined content.

In some embodiments, semantic recognition may be performed on the content submitted by the client. If it is determined that the content represents a preset meaning, the content can be determined as including the predetermined content. For example, automatic semantic recognition may be performed, by means of artificial intelligence, on the content submitted by the client. For example, a recognition model for the preset meaning may be established by using a machine learning method. Based on the recognition model, semantic analysis may be performed on the content submitted by the client. Semantic recognition may also be implemented in other manners, which are not limited in this specification.

In some embodiments, the predefined lexicon or the preset meaning may be determined according to an actual requirement, to establish the predetermined content. For example, according to national or regional laws, some illegal keywords may be included to define a lexicon, and/or meanings that may represent illegal information may be considered to establish the predetermined content. Accordingly, based on the defined lexicon and the considered illegal meanings, the content submitted by the client may be determined whether it includes the predetermined content. Alternatively, the predefined lexicon or the preset meaning may also be set in other manners, which are not limited in this specification.

Figure 2:
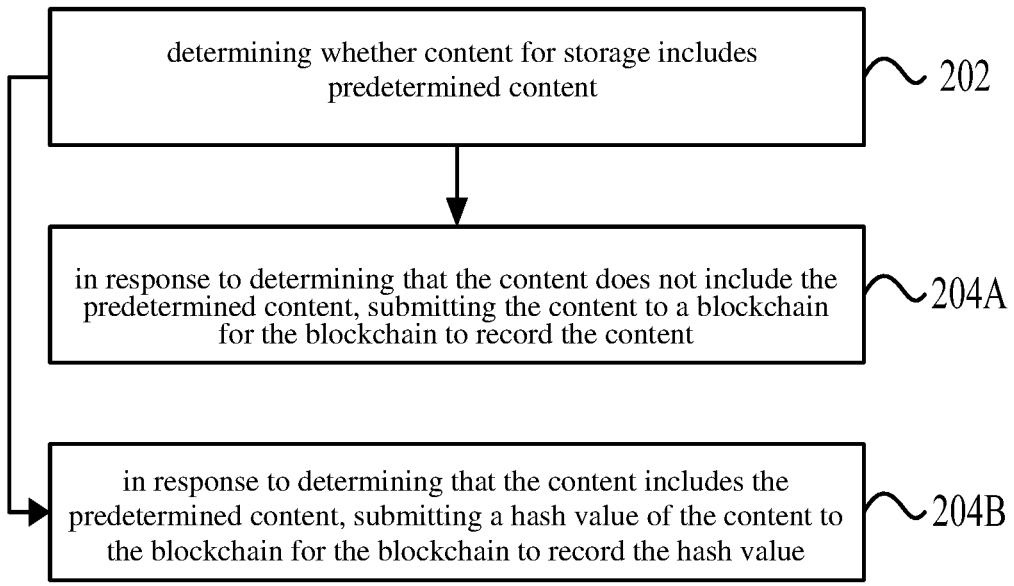
FIG. 2 is a flowchart of another blockchain-based content management method according to some embodiments.

FIG. 2 is a flowchart of a blockchain-based content management method according to some embodiments. As shown in FIG. 2, the method is applied to a blockchain node, and may include the following steps:

Step 202: determining whether content for storage includes predetermined content.

Step 204A: in response to determining that the content does not include the predetermined content, submitting the content to a blockchain for the blockchain to record the content.

In some embodiments, the blockchain node may identify content submitted by the client, to determine whether the content includes the predetermined content. For example, when the content does not include the predetermined content, the content may be submitted to the blockchain. The "submission" is a process that may be replaced or accompanied by other processes releasing data to a blockchain in the related technology area. If the content doesn't include the predetermined content, whether the content is made public or not is not a concern. As a result, the content can be directly released to the blockchain.

Step 204B: in response to determining that the content includes the predetermined content, submitting a hash value of the content to the blockchain for the blockchain to record the hash value.

In some embodiments, for the content including the predetermined content, the blockchain node may release a hash value of the content to the blockchain by submitting a blockchain transaction to the blockchain, so that the hash value is recorded into a blockchain ledger. Correspondingly, the content is not released to the blockchain to prevent the content from being recorded into the blockchain ledger or being disclosed to other blockchain nodes.

In some embodiments, when the content includes the predetermined content, the blockchain node may store the content into a centralized storage space. According to a unique mapping relationship between the hash value and the content, the corresponding content can be retrieved and traced in the centralized storage space based on the hash value. Moreover, because the hash value is recorded and certified in the blockchain ledger and tamper-resistant after being released to the blockchain, it can be verified whether content stored in the centralized storage space is tampered.

In some embodiments, the centralized storage space may include distributed storage spaces of the blockchain (e.g., respective storage spaces of the blockchain nodes for maintaining the blockchain ledger) to ensure that the content cannot be obtained randomly by the blockchain nodes after being stored into the centralized storage space. For example, the centralized storage space may include: a storage space corresponding to a blockchain node, such as a local space of the blockchain node, or a cloud space corresponding to the blockchain node. For another example, the centralized storage space may include: a storage space of a centralized server. Although the centralized storage space is logically different from the distributed storage spaces of the blockchain, the centralized storage space can technically adopt distributed storage architectures in related technology domains, which are not limited in this specification.

In some embodiments, the centralized storage space has a corresponding administrator, who has a management permission of the centralized storage space. When the content is determined as including the predetermined content, the administrator can perform access permission management on the content by, for example, allowing only objects in a whitelist to access the content, prohibiting objects in a blacklist from accessing the content, allowing only objects whose permission levels are not lower than a preset level to access the content, or allowing only objects authorized by the administrator to access the content, another suitable access permission management policy, or any combination thereof. The administrator of the centralized storage space may include the foregoing blockchain node; alternatively, the administrator of the centralized storage space may include an object other than the blockchain node. For example, when the centralized storage space is a centralized server, the administrator may be administrative personnel of the centralized server.

In some embodiments, when the content includes the predetermined content, the blockchain node may add an identifier to the hash value and/or the content, so as to quickly recognize that the content or the content corresponding to the related hash value includes the predetermined content. When the administrator of the centralized storage space is not the foregoing blockchain node, the administrator can determine that the content includes the predetermined content based on the identifier associated with the content. Based on the determination, the administrator may implement corresponding management means for the content, for example, an access permission management scheme, and the like. Alternatively, when receiving content provided by the blockchain node, the administrator may calculate a hash value of the content and search the blockchain ledger based on the hash value to find a blockchain transaction including the hash value, and determine whether the blockchain transaction includes the foregoing identifier. When the blockchain transaction includes the identifier indicating the content includes the predetermined content, the corresponding content management means may be implemented for the content; otherwise, the content may be managed as ordinary content.

In some embodiments, when the content includes the predetermined content, the blockchain node may delete the content to prevent leakage of the content.

In some embodiments, the content may be compared with a predefined lexicon, and when the content contains a keyword from the predefined lexicon, the content is determined as including the predetermined content.

In some embodiments, semantic recognition may be performed on the content submitted by the client. If it is determined that the content represents a preset meaning, the content can be determined as including the predetermined content. For example, automatic semantic recognition may be performed, by means of artificial intelligence, on the content submitted by the client. For example, a recognition model for the preset meaning may be established by using a machine learning method. Based on the recognition model, semantic analysis may be performed on the content submitted by the client. Semantic recognition may also be implemented in other manners, which are not limited in this specification.

In some embodiments, the predefined lexicon or the preset meaning may be determined according to an actual requirement, to establish the predetermined content. For example, according to national or regional laws, some illegal keywords may be included to define a lexicon, and/or meanings that may represent illegal information may be considered to establish the predetermined content. Accordingly, based on the defined lexicon and the considered illegal meanings, the content submitted by the client may be determined whether it includes the predetermined content. Alternatively, the predefined lexicon or the preset meaning may also be set in other manners, which are not limited in this specification.

Figure 3:
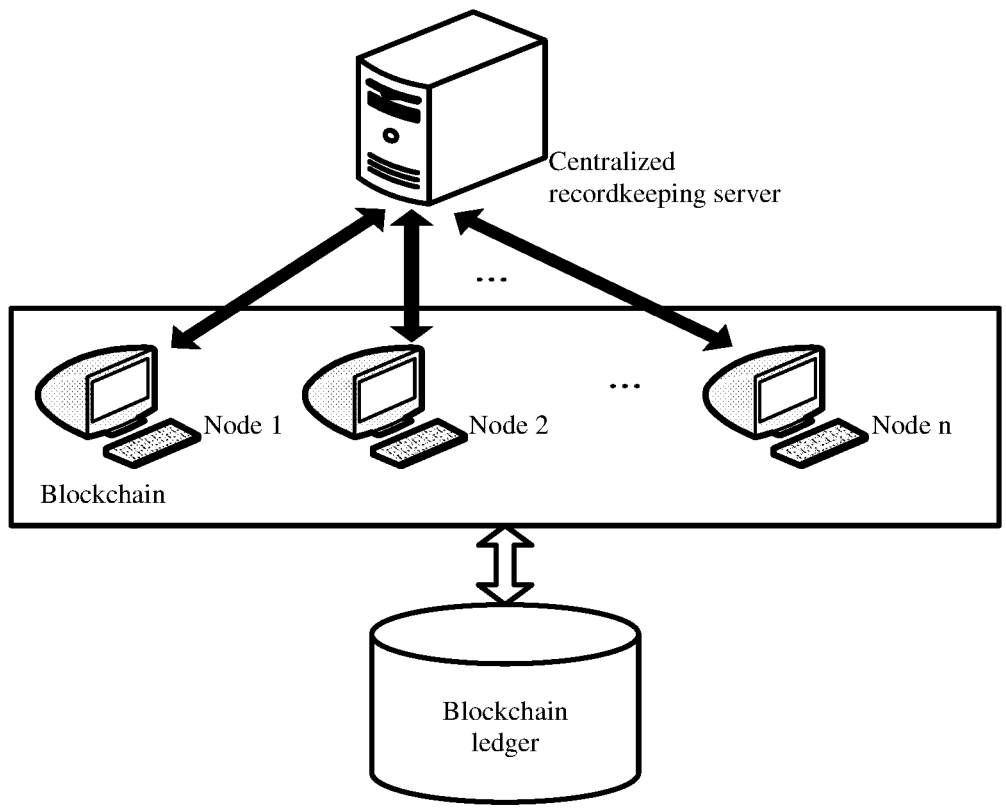
FIG. 3 is a schematic diagram of a blockchain-based content management system according to some embodiments.

FIG. 3 is a schematic structural diagram of a blockchain-based content management system according to some embodiments. As shown in FIG. 3, the content management system may include: several blockchain nodes in a blockchain and a centralized server. The blockchain nodes may include a node 1, a node 2 . . . , a node n as shown in FIG. 3. Each blockchain node may interact with the centralized server independently. In addition, the node 1 to the node n may each maintain full blockchain transaction data to form a blockchain ledger with uniform content. In other words, the content of the blockchain ledger is in a public state with respect to the blockchain nodes.

Figure 4:
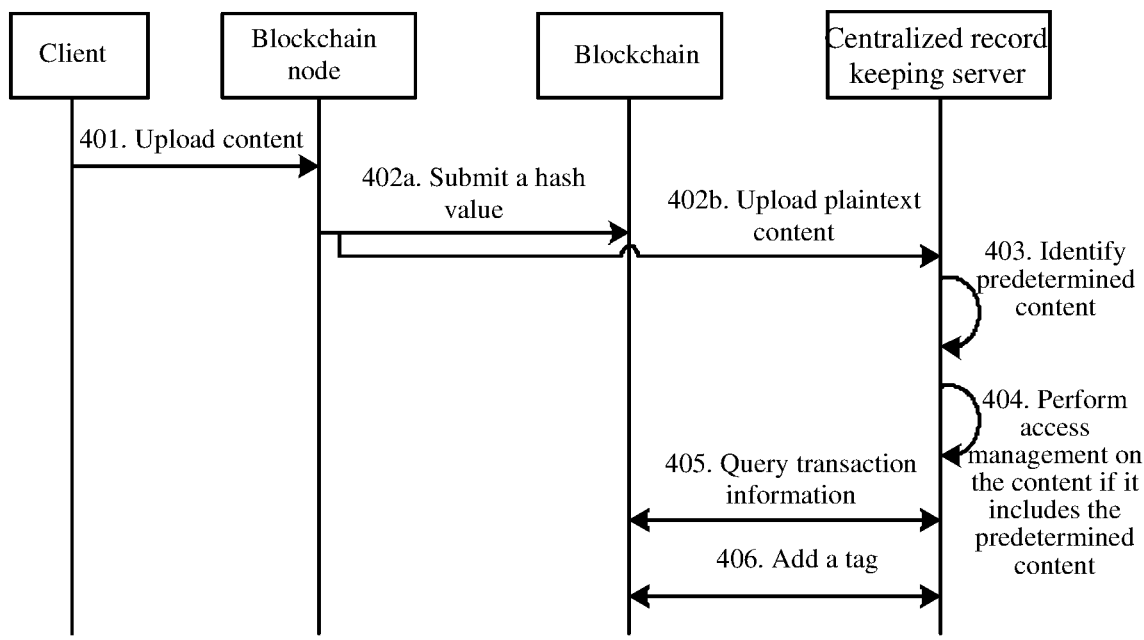
FIG. 4 is a schematic diagram of a blockchain-based content management method according to some embodiments.

Corresponding to the content management system shown in FIG. 3, FIG. 4 is a schematic diagram of a blockchain-based content management method according to some embodiments. As shown in FIG. 4, the method may be implementable by any blockchain node (e.g., any node from node 1 to node n shown in FIG. 3) in a blockchain, and may include the following steps:

Step 401: A blockchain node receives content uploaded by a client.

In some embodiments, the client may upload to the blockchain node any content that the client wants to submit to a blockchain, such as a piece of data, or a piece of transfer information, or the like.

Step 402a: The blockchain node submits a hash value of the content to the blockchain.

Step 402b: The blockchain node uploads plaintext content to a centralized server.

In some embodiments, instead of directly submitting the content uploaded by the client to the blockchain, the blockchain node generates a hash value of the content, and submits the hash value to the blockchain, so that the hash value is recorded in the blockchain ledger maintained by each blockchain node. Therefore, the hash value is tamper-resistant and verifiable. Moreover, based on a unique correspondence between the content and the hash value, the hash value recorded in the blockchain ledger can be further used for verifying the content, such as determining whether the related content is tampered.

In some embodiments, the content uploaded by the client is uploaded in a plaintext form to the centralized server, rather than being directly uploaded to the blockchain. By not uploading to the blockchain, the data volume of the blockchain can be reduced, hence the data storage pressure of each blockchain node can be alleviated. In addition, it can prevent the content from being disclosed to each blockchain node, especially when the content uploaded by the client includes the predetermined content.

Step 403: The centralized server records the content uploaded by the blockchain node, and identifies whether the content includes the predetermined content.

In some embodiments, when the content uploaded by the blockchain node does not include the predetermined content, the centralized server may set an access management mode for the related content according to a mode for normal data. For example, the access permission is completely open to registered users of the centralized server.

In some embodiments, the content may be compared with a predefined lexicon. When the content contains a keyword from the predefined lexicon, the content is determined as including the predetermined content.

In some embodiments, semantic recognition may be performed on the content submitted by the client. If it is determined that the content represents a preset meaning, the content can be determined as including the predetermined content. For example, automatic semantic recognition may be performed, by means of artificial intelligence, on the content submitted by the client. For example, a recognition model for the preset meaning may be established by using a machine learning method. Based on the recognition model, semantic analysis may be performed on the content submitted by the client. Semantic recognition may also be implemented in other manners, which are not limited in this specification.

In some embodiments, the predefined lexicon or the preset meaning may be determined according to an actual requirement, to establish the predetermined content. For example, according to national or regional laws, some illegal keywords may be included to define a lexicon, and/or meanings that may represent illegal information may be considered to establish the predetermined content. Accordingly, based on the defined lexicon and the considered illegal meanings, the content submitted by the client may be determined whether it includes the predetermined content. Alternatively, the predefined lexicon or the preset meaning may also be set in other manners, which are not limited in this specification.

Step 404: The centralized server can perform access management on the content when the content uploaded by the blockchain node includes the predetermined content.

In some embodiments, the access management for the content including the predetermined content may include access permission management. For example, the centralized server may grant an access permission to some of registered users, so that only these users (where a user identity may be determined by means of account login, real-person authentication, and the like) can access the predetermined content. In another example, the centralized server may restrict users with low permission levels from accessing the content, or use other access permission management schemes.

Step 405: The centralized server queries blockchain transaction information related to the content that includes the predetermined content.

In some embodiments, the centralized server may calculate a hash value of the content, and perform a query operation in the blockchain ledger based on the hash value to find a blockchain transaction including the hash value, thereby obtaining corresponding transaction information. Correspondingly, the centralized server may associate the transaction information with the content, and record such association to facilitate subsequent query and management.

Step 406: The centralized server adds a predetermined tag to the hash value or the blockchain transaction corresponding to the content that includes the predetermined content.

In some embodiments, the centralized server may submit a blockchain transaction to the blockchain that adds a predetermined tag (such as an identifier) to the hash value of the content or a state of the blockchain transaction that includes the hash value. Subsequently, when any object queries the hash value or the blockchain transaction in the blockchain ledger, the predetermined tag may be read from the blockchain ledger that indicates that the content corresponding to the hash value includes the predetermined content.

As discussed above, in some embodiments of this specification, each blockchain node may submit only a hash value of content to a blockchain, while the content is stored in a centralized server or another centralized storage space. This is to prevent the content, especially when the content includes the predetermined content, from being recorded into a blockchain ledger, thereby preventing leakage of the content. Moreover, the centralized storage space may create an index based on the hash values, so that each object may search a content based on the corresponding hash value, to ensure normal access to the content. For the content that includes the predetermined content, the centralized storage space may implement corresponding access permission management to prevent the content from being accessed randomly. In addition, because the hash value recorded and certified in the blockchain ledger cannot be tampered randomly, the hash value can further be used for verifying the content in the centralized storage space to ensure accuracy of the content.

Figure 5:
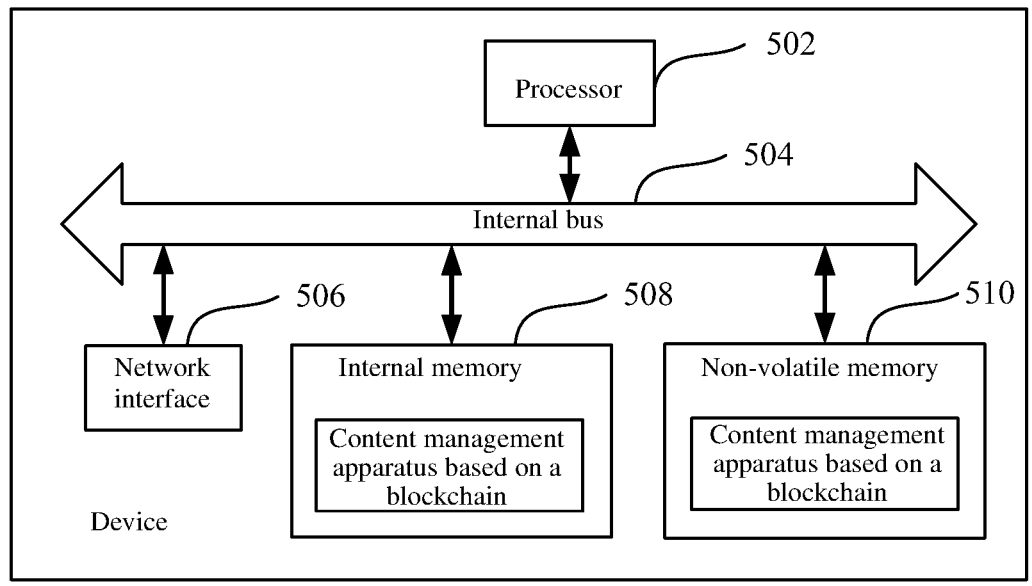
FIG. 5 is a schematic structural diagram of a blockchain-based content management device according to some embodiments.

FIG. 5 is a schematic structural diagram of a blockchain-based content management device according to some embodiments. Referring to FIG. 5, on a hardware level, the device includes a processor 502, an internal bus 504, a network interface 506, an internal memory 508, and a non-volatile memory 510, and may further include other hardware required for services. The processor 502 reads corresponding computer programs from the non-volatile memory 510 into the internal memory 508 and then runs the computer programs to form a blockchain-based content management apparatus on a logic level. In addition to the software implementation, one or more embodiments of the specification do not exclude other implementations, such as a logic device or a combination of software and hardware. In other words, entities executing the processes are not limited to the logic units but may also be hardware or logic devices.

Figure 6:
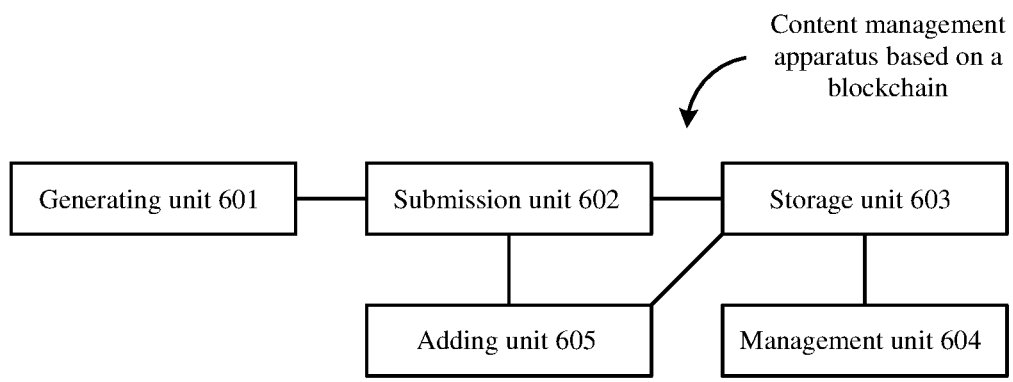
FIG. 6 is a block diagram of a blockchain-based content management apparatus according to some embodiments.

FIG. 6 is a block diagram of a blockchain-based content management apparatus according to some embodiments. The apparatus is implementable by a blockchain node, and may include:

a generating unit 601, configured to generate a corresponding hash value for content submitted by a client;

a submission unit 602, configured to submit the hash value to a blockchain, so that the hash value is recorded into a blockchain ledger; and a storage unit 603, configured to store the content into a centralized storage space.

In some embodiments, the centralized storage space includes: a storage space corresponding to the blockchain node, or a storage space of a centralized server.

In some embodiments, the apparatus further includes:

a management unit 604, configured to perform access permission management on the content when the blockchain node has the permission to manage the content that includes the predetermined content.

In some embodiments, the storage unit 603 is specifically configured to:

store the content into the centralized storage space when the content does not include the predetermined content; and delete the content when the content includes predetermined content.

In some embodiments, the method further includes:

an adding unit 605, configured to add an identifier to the hash value and/or the content when the content includes the predetermined content.

In some embodiments, the content is determined as including the predetermined content when the content contains a keyword from a predefined lexicon or the content represents a preset meaning.

Figure 7:
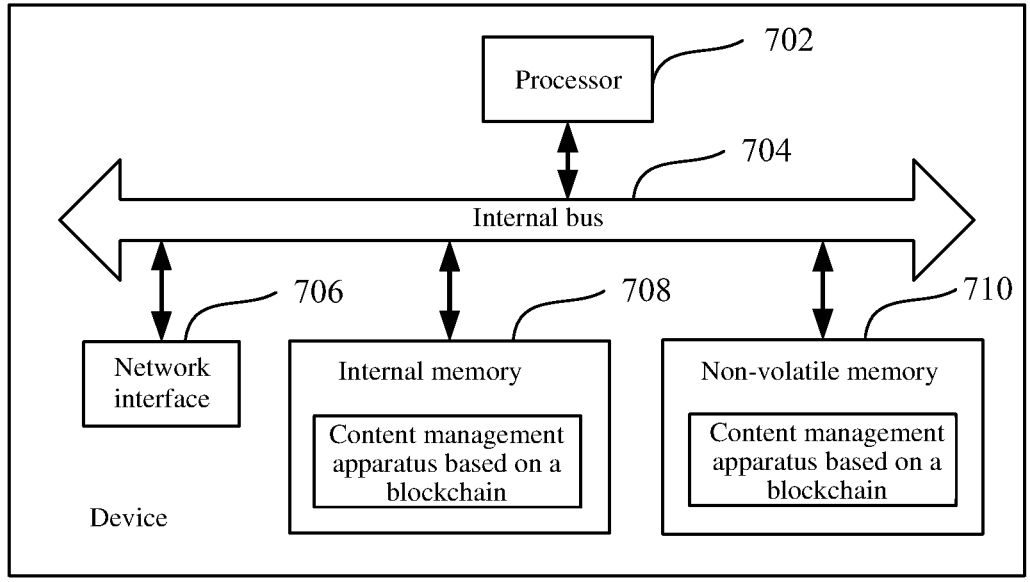
FIG. 7 is a schematic structural diagram of another blockchain-based content management device according to some embodiments.

FIG. 7 is a schematic structural diagram of another blockchain-based content management device according to some embodiments. Referring to FIG. 7, on a hardware level, the device includes a processor 702, an internal bus 704, a network interface 706, an internal memory 708, and a non-volatile memory 710, and may further include other hardware required for services. The processor 702 reads a corresponding computer program from the non-volatile memory 710 into the internal memory 708 and then runs the computer program, to form a blockchain-based content management apparatus on a logic level. In addition to the software implementation, one or more embodiments of this specification do not exclude other implementations, such as a logic device or a combination of software and hardware.

In other words, entities executing the following processing procedures are not limited the logic units but may also be hardware or logic devices.

Figure 8:
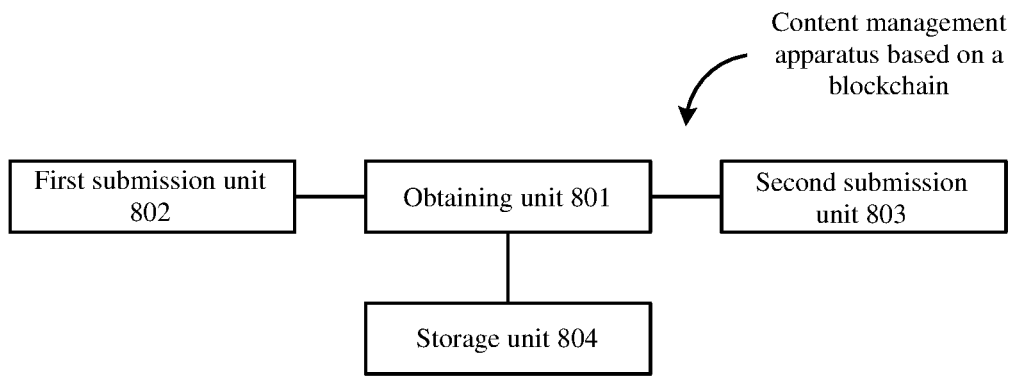
FIG. 8 is a block diagram of another blockchain-based content management apparatus according to some embodiments.

FIG. 8 is a block diagram of another blockchain-based content management apparatus according to some embodiments. The apparatus is implementable by a blockchain node, and may include:

an obtaining unit 801, configured to obtain content submitted by a client;

a first submission unit 802, configured to submit the content to a blockchain when the content does not include the predetermined content, so that the content is recorded into a blockchain ledger; and a second submission unit 803, configured to submit a hash value of the content to the blockchain when the content includes the predetermined content.

In some embodiments, the method further includes:

a storage unit 804, configured to store the content into a centralized storage space or delete the content when the content includes the predetermined content.

In some embodiments, the content is determined as including the predetermined content when the content contains a keyword from a predefined lexicon or the content represents a preset meaning.

The system, apparatus, modules or units illustrated in the foregoing embodiment may be specifically implemented by a computer chip or an entity or implemented by a product having a specific function. A typical implementation device is a computer, and a specific form of the computer may be a personal computer, a laptop computer, a cellular phone, a camera phone, a smartphone, a personal digital assistant, a media player, a navigation device, an email sending and receiving device, a game console, a tablet computer, or a wearable device, or a combination of any of these devices.

This specification provides a computer readable medium, on which computer instructions is stored. When the instructions are executed, some embodiments of the specification, such as the event processing methods based on a blockchain in any of the foregoing embodiments, is implemented. Details are not described herein again.

In a typical configuration, the computer includes one or more processors (CPUs), an input/output interface, a network interface, and a memory.

The memory may include forms such as a non-volatile memory in a computer readable medium, a random-access memory (RAM), and/or a non-volatile memory, such as a read-only memory (ROM) or a flash memory (flash RAM). The memory is an example of the computer readable medium.

The computer readable medium includes volatile and non-volatile, removable and non-removable media, which may store information by using any method or technology. The information may be a computer readable instruction, a data structure, a program module, or other data. The example of the computer storage medium includes, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storages, a cassette tape, a disk storage, a quantum memory, a grapheme-based storage medium or other magnetic storage devices, or any other non-transmission media, which may be configured to store information that may be accessed by a computing device. According to the specification, the computer readable medium does not include transitory computer readable media (transitory media), such as a modulated data signal and carrier.

The terms "include", "comprise", and any variants thereof herein are intended to cover a non-exclusive inclusion. Therefore, in the context of a process, a method, a commodity, or a device that includes a series of elements, the process, method, commodity or device not only includes such elements, but also includes other elements not specified expressly, or may include elements inherent to the process, method, commodity or device. Unless otherwise specified, an element limited by "include a/an . . . " does not exclude other same elements existing in the process, method, commodity or device that includes the element.

Some embodiments of the specification are described above. Other embodiments may fall within the scope of the appended claims. In some embodiments, the actions or steps recorded in the claims may be performed in a sequence different from that in the other embodiments and can still achieve an expected result. In addition, the process depicted in the accompanying drawing can achieve the expected result without necessarily following the sequence shown or a consecutive sequence. In some embodiments, multi-task processing and parallel processing are also possible and may be beneficial.

The terms used in one or more embodiments of the specification are merely for the purpose of describing the specific embodiments and are not intended to limit one or more embodiments of the specification. The singular forms "one," "said," and "the" used in one or more embodiments of the specification and the appended claims are also intended to include plurality forms, unless otherwise indicated clearly in the context. It should also be understood that, the term "and/or" used in this text refers to and include any or all possible combinations of one or more associated items listed.

Terms such as first, second, and third may be used in one or more embodiments of the specification to describe various information, and the information is not limited to these terms. These terms are merely used for distinguishing information of the same type from each other. For example, without departing from the scope of one or more embodiments of the specification, first information may also be referred to as second information. Similarly, second information may also be referred to as first information. Depending on the context, the word "if" used herein may be interpreted as "while" or "when" or "in response to determining of."

The foregoing descriptions are merely some embodiments of the specification but are not intended to limit the scope of the specification. Any modification, equivalent replacement, or improvement made within the spirit and principle of one or more embodiments of the specification shall fall within the protection scope of the specification.

What is claimed is:

1. A computer-implemented blockchain-based content management system, comprising:
a blockchain node comprising one or more processors and one or more non-transitory computer-readable memories coupled to the one or more processors and configured with instructions executable by the one or more processors to cause the one or more processors to perform operations comprising:
receiving data for storage in a blockchain;
determining a hash value of the data;
determining whether the data includes a predetermined content;

in response to determining that the data does not include the predetermined content, submitting a blockchain transaction comprising the hash value of the data to the blockchain for the blockchain to record the hash value, without storing the data to the blockchain; and in response to determining that the data includes the predetermined content,
  updating the hash value by adding an identifier indicating that the data corresponding to the hash value includes the predetermined content,
  submitting a blockchain transaction comprising the updated hash value of the data to the blockchain for the blockchain to record the updated hash value without storing the data to the blockchain, and
  storing the data in a storage space of a centralized server, wherein the centralized server is configured to search the blockchain for transaction information associated with the data according to the hash value of the data.

2. The system according to claim 1, wherein the blockchain node is further configured to:
  in response to determining that the data includes the predetermined content, store the data in a storage space of the blockchain node, the storage space being separated from the blockchain.

3. The system according to claim 2, wherein the blockchain node is further configured to:
  perform access permission management on the data if the blockchain node has permission to manage the storage space.

4. The system according to claim 1, wherein the blockchain node is further configured to:
  in response to determining that the data includes the predetermined content, add an identifier to the data.

5. The system according to claim 1, wherein the blockchain node is further configured to:
  in response to determining that the data includes the predetermined content, delete the data.

6. The system according to claim 1, wherein the data is determined as including the predetermined content if the data contains a keyword from a predefined lexicon or the data represents a preset meaning.

7. The system according to claim 1, wherein, the submitting the blockchain transaction comprising the updated hash value to the blockchain comprises:
  not releasing the predetermined content to the blockchain.

8. The system according to claim 1, wherein the centralized server is further configured to:
  in response to determining that the data includes the predetermined content, set a content management mode for the predetermined content; and
  in response to determining that the data does not include the predetermined content, set an access management mode for the data according to a mode for normal data, the access management mode being less restrictive than the content management mode.

9. A blockchain-based content management method, implementable by a blockchain node, comprising:
  receiving data for storage in a blockchain;
  determining a hash value of the data;
  determining whether the data includes a predetermined content;
  in response to determining that the data does not include the predetermined content, submitting a blockchain transaction comprising the hash value of the data to the blockchain for the blockchain to record the hash value, without storing the data to the blockchain; and
  in response to determining that the data includes the predetermined content,
    updating the hash value by adding an identifier indicating that the data corresponding to the hash value includes the predetermined content,
    submitting a blockchain transaction comprising the updated hash value of the data to the blockchain for the blockchain to record the updated hash value without storing the data to the blockchain, and
    storing the data in a storage space of a centralized server, wherein the centralized server is configured to search the blockchain for transaction information associated with the data according to the hash value of the data.

10. The method according to claim 9, wherein the storage space is separated from the blockchain.

11. The method according to claim 10, wherein in response to determining that the data includes the predetermined content, the method further comprises:
  performing access permission management on the data if the blockchain node has permission to manage the storage space.

12. The method according to claim 9, wherein in response to determining that the data includes the predetermined content, the method further comprises:
  adding an identifier to the data.

13. The method according to claim 9, wherein in response to determining that the data includes the predetermined content, the method further comprises:
  deleting the data.

14. The method according to claim 9, wherein the data is determined as including the predetermined content if the data contains a keyword from a predefined lexicon or the data represents a preset meaning.

15. A non-transitory computer-readable storage medium for blockchain-based content management, configured with instructions executable by one or more processors to cause the one or more processors to perform operations comprising:
  receiving data for storage in a blockchain;
  determining a hash value of the data;
  determining whether the data includes a predetermined content;
  in response to determining that the data does not include the predetermined content, submitting a blockchain transaction comprising the hash value of the data to the blockchain for the blockchain to record the hash value, without storing the data to the blockchain; and
  in response to determining that the data includes the predetermined content,
    updating the hash value by adding an identifier indicating that the data corresponding to the hash value includes the predetermined content,
    submitting a blockchain transaction comprising the updated hash value of the data to the blockchain for the blockchain to record the updated hash value without storing the data to the blockchain, and
    storing the data in a storage space of a centralized server, wherein the centralized server is configured to search the blockchain for transaction information associated with the data according to the hash value of the data.

\* \* \* \* \*